No. 772,808. PATENTED OCT. 18, 1904.
F. J. KLINGER.
STEERING GEAR FOR VEHICLES.
APPLICATION FILED FEB. 25, 1904.
NO MODEL. 2 SHEETS—SHEET 1.
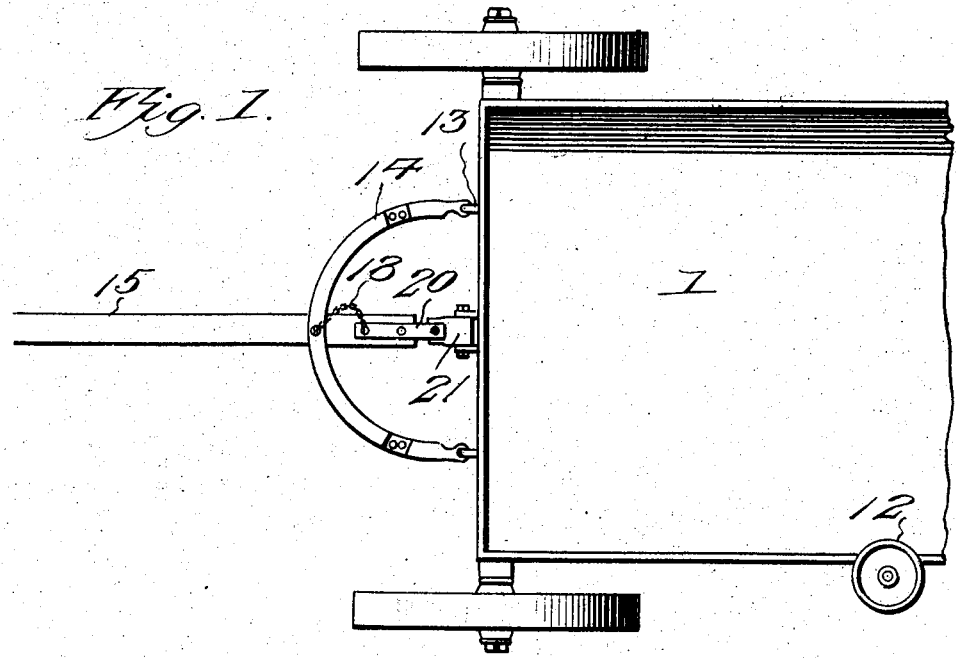
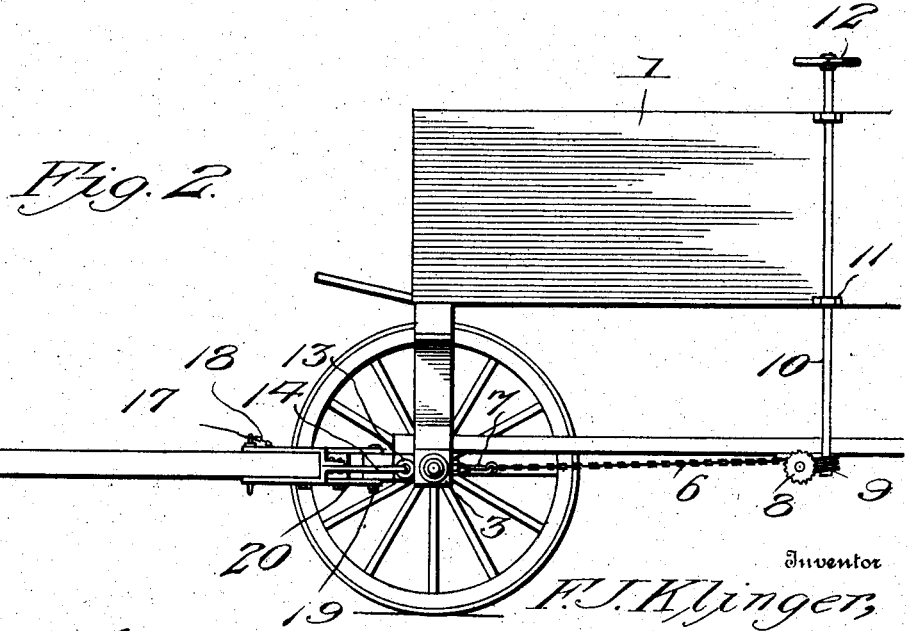

No. 772,808. PATENTED OCT. 18, 1904.
F. J. KLINGER.
STEERING GEAR FOR VEHICLES.
APPLICATION FILED FEB. 25, 1904.
NO MODEL. 2 SHEETS—SHEET 2.
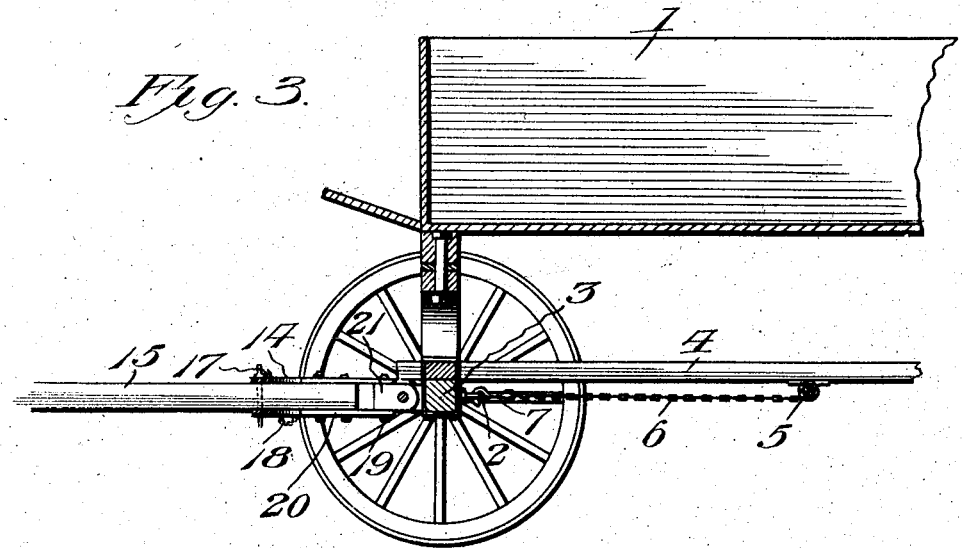
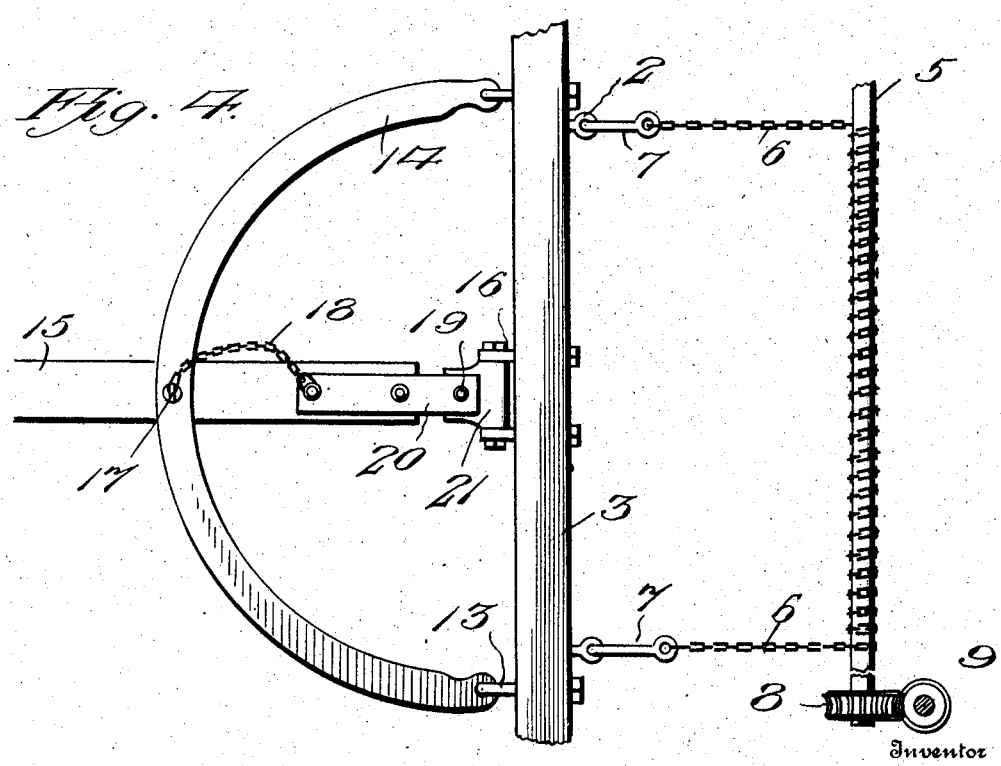
Witnesses
Inventor
F. J. Klinger,
By Victor J. Evans
Attorney No. 772,808. Patented October 18, 1904.

UNITED STATES PATENT OFFICE.

FRED J. KLINGER, OF WATERTOWN, WISCONSIN, ASSIGNOR OF ONE-HALF TO JAMES J. SOLON, OF REESEVILLE, WISCONSIN.

STEERING-GEAR FOR VEHICLES.

SPECIFICATION forming part of Letters Patent No. 772,808, dated October 18, 1904.

Application filed February 25, 1904. Serial No. 195,301. (No model.)

*To all whom it may concern:*

Be it known that I, FRED J. KLINGER, a citizen of the United States, residing at Watertown, in the county of Jefferson and State of Wisconsin, have invented new and useful Improvements in Steering-Gear for Vehicles, of which the following is a specification.

My invention relates to new and useful improvements in vehicles, and more particularly to the steering-gear thereof; and its object is to provide means whereby the front wheels of the vehicle can be rotated independently of the positions of the animal or animals connected to the vehicle.

The invention consists of a transversely-extending shaft which is secured to the vehicle and is adapted to be rotated by an upwardly-extending shaft which projects to a point above the vehicle and within convenient reach of the operator. A chain or other flexible operating device is wound upon the transversely-extending shaft and is connected to the front axle of the vehicle near the ends thereof. Hounds are secured to the front of the axle, and arranged therebetween is the tongue of the vehicle, which is pivoted to the axle and is adapted to slide between the hounds. Means are provided for locking the tongue to the hounds, so as to prevent independent movement thereof.

The invention also consists in the further novel construction and combination of parts hereinafter more fully described and claimed, and illustrated in the accompanying drawings, showing the preferred form of my invention, and in which—

Figure 1 is a plan view of a portion of a vehicle having my improved steering mechanism thereon. Fig. 2 is a side elevation thereof. Fig. 3 is a central longitudinal section therethrough, and Fig. 4 is a top plan view of the steering mechanism with the wagon-body removed.

Referring to the figures by numerals of reference, 1 is a vehicle-body having eyes 2 extending rearwardly from the front axle 3, these eyes being arranged adjacent the ends of the axle.

Secured to the running-gear 4 of the vehicle is a transversely-extending shaft 5, having a chain 6 or other flexible device wound thereon, and secured to the ends of this chain are hooks 7, which are adapted to engage the eyes 2. A worm-wheel 8 is secured to one end of the shaft and meshes with a worm 9, which is fastened to the lower portion of a shaft 10, journaled in brackets 11 on the side of the vehicle-body. A hand-wheel 12 is secured to the shaft so as to permit the same to be readily turned. Eyes 13 extend forward from the axle 3 near its ends, and loosely connected thereto are the ends of semicircular strips 14, which form hounds. Arranged between these strips is a tongue 15, which is pivoted between ears 16, extending forward from the center of the axle. A pin 17 is adapted to project through the hounds 14 and the tongue 15, so as to prevent independent movement thereof. This pin is preferably secured in place by means of a chain 18.

Under ordinary circumstances the hooks 7 are disengaged from the eyes 2, and the pin 17 is in position within the hounds 14 and tongue 15. It will thus be seen that when the draft-animals move to one side or the other the axle 3 will be carried therewith and the vehicle guided in the ordinary manner. If, however, it becomes desirable to guide the vehicle independently of the positions assumed by the draft-animals, the pin 17 is withdrawn and the hooks 7 placed in engagement with the eyes 2. By rotating the shaft 10 the shaft 5 can be turned and the axle 3 swung in a desired direction. As the tongue 15 is pivoted upon a pin 19, which extends through straps 20, projecting from the tongue and through a pivoted head 21, secured between the ears 16, it will be seen that the axle 3 can be swung in any desired direction without producing a corresponding movement of the tongue 15.

The mechanism herein described is especially adapted for use in guiding the vehicle accurately into position or through a narrow space.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

The combination with a vehicle having a pivoted axle, and ears extending from the axle; of a head pivoted between the ears and movable in a vertical plane, a laterally-movable tongue pivoted to the head, eyes extending from the axle, similar curved strips pivoted to the eyes and adapted to swing in a vertical plane, said strips extending across opposite faces of the tongue, means for locking the strips to the tongue, a transversely-extending shaft connected to the vehicle, a flexible device wound upon the shaft and detachably secured at its ends to the axle adjacent its ends, and means upon the vehicle for rotating the shaft.

In testimony whereof I affix my signature in presence of two witnesses.

FRED J. KLINGER.

Witnesses:
  WILLIE RENNHACK,
  OTTO DAUFFENBACH.